(12) United States Patent
Bhattacharyya et al.

(10) Patent No.: US 11,144,307 B2
(45) Date of Patent: *Oct. 12, 2021

(54) SERVICE INTERFACE CREATION AND MODIFICATION FOR OBJECT-ORIENTED SERVICES

(71) Applicant: INTERNATIONAL BUSINESS MACHINES CORPORATION, Armonk, NY (US)

(72) Inventors: Anamitra Bhattacharyya, Littleton, MA (US); Seenivasan Chandrasekararaja, Winchester, MA (US); Alfredo Cortes, London (CA); Boris Dozortsev, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 670 days.

This patent is subject to a terminal disclaimer.

(21) Appl. No.: 15/463,736

(22) Filed: Mar. 20, 2017

(65) Prior Publication Data

US 2017/0192776 A1 Jul. 6, 2017

Related U.S. Application Data

(63) Continuation of application No. 12/170,009, filed on Jul. 9, 2008, now Pat. No. 9,639,331.

(51) Int. Cl.
*G06F 8/34* (2018.01)
*G06F 8/71* (2018.01)

(52) U.S. Cl.
CPC . *G06F 8/71* (2013.01); *G06F 8/34* (2013.01)

(58) Field of Classification Search
CPC .................................. G06F 8/71; G06F 8/34
See application file for complete search history.

(56) References Cited

U.S. PATENT DOCUMENTS 5,280,610 A * 1/1994 Travis, Jr. ............... G06F 9/465
5,493,682 A 2/1996 Tyra et al.
5,936,860 A 8/1999 Arnold et al.
5,987,423 A 11/1999 Arnold et al.
(Continued)

OTHER PUBLICATIONS

Anonymous, "Definition of Organize by the online Merriam-Webster dictionary", online Merriam-Webster dictionary, 2006, https://web.archive.org/web/20060618123708/http://www.merriam-webster.com/dictionary/organize.

(Continued)

*Primary Examiner* — Daxin Wu
(74) *Attorney, Agent, or Firm* — Fabian VanCott; Steven L. Nichols

(57) ABSTRACT

A method includes establishing a hierarchy of related software object classes according to a service, receiving data from an external process to invoke the service, and organizing the data received from the external process according to the hierarchy. A system includes a graphical user interface on a computing device configured to allow a user to organize a plurality of related software object classes into a hierarchy according to a service, and a service interface on a computing device configured to organize data received from an external service according to the hierarchy to allow the external process to invoke the service.

20 Claims, 10 Drawing Sheets

(56) References Cited

U.S. PATENT DOCUMENTS

| | | | |
|---|---|---|---|
| 6,023,578 A | 2/2000 | Birsan et al. | |
| 6,345,382 B1 | 2/2002 | Hughes | |
| 6,601,233 B1 | 7/2003 | Underwood | |
| 6,681,383 B1 | 1/2004 | Pastor et al. | |
| 6,694,506 B1 | 2/2004 | LeBlanc et al. | |
| 6,895,581 B1 | 5/2005 | Chkodrov et al. | |
| 6,947,959 B1* | 9/2005 | Gill | G06F 17/30011 707/999.003 |
| 7,293,254 B2 | 11/2007 | Bloesch et al. | |
| 7,313,619 B2 | 12/2007 | Torrant et al. | |
| 7,404,195 B1 | 7/2008 | Sawicki et al. | |
| 7,480,897 B2 | 1/2009 | Reinhardt et al. | |
| 7,546,577 B2 | 6/2009 | Do et al. | |
| 7,793,255 B1 | 9/2010 | Kawaguchi et al. | |
| 7,966,602 B1 | 6/2011 | Webster et al. | |
| 8,234,620 B1 | 7/2012 | Bychkov et al. | |
| 2001/0018648 A1* | 8/2001 | Turner | G06F 8/36 703/22 |
| 2002/0091990 A1 | 7/2002 | Little et al. | |
| 2002/0104071 A1 | 8/2002 | Charisius et al. | |
| 2002/0120917 A1 | 8/2002 | Abrari et al. | |
| 2003/0014442 A1* | 1/2003 | Shiigi | G06F 8/20 715/255 |
| 2003/0212778 A1 | 11/2003 | Collomb | |
| 2003/0226132 A1 | 12/2003 | Tondreau et al. | |
| 2004/0111284 A1 | 6/2004 | Uijttenbroek | |
| 2004/0181775 A1* | 9/2004 | Anonsen | G06Q 10/10 717/104 |
| 2004/0226001 A1 | 11/2004 | Teegan et al. | |
| 2004/0233232 A1 | 11/2004 | Iborra et al. | |
| 2005/0010580 A1 | 1/2005 | Lancefield | |
| 2005/0039173 A1 | 2/2005 | Tondreau et al. | |
| 2005/0060687 A1 | 3/2005 | Ghazaleh et al. | |
| 2005/0066306 A1 | 3/2005 | Diab | |
| 2005/0091576 A1 | 4/2005 | Relyea et al. | |
| 2005/0149908 A1 | 7/2005 | Klianev | |
| 2005/0197824 A1 | 9/2005 | Van Dalen | |
| 2005/0262473 A1 | 11/2005 | Kocka | |
| 2006/0015851 A1 | 1/2006 | Poole | |
| 2006/0026588 A1* | 2/2006 | Illowsky | G06F 8/61 717/171 |
| 2006/0150169 A1* | 7/2006 | Cook | G06F 8/10 717/156 |
| 2006/0293934 A1 | 12/2006 | Tsyganskiy et al. | |
| 2007/0074156 A1 | 3/2007 | Nelson et al. | |
| 2007/0094638 A1 | 4/2007 | DeAngelis et al. | |
| 2007/0277153 A1 | 11/2007 | Ambrose et al. | |
| 2007/0283324 A1 | 12/2007 | Geisinger | |
| 2007/0288887 A1 | 12/2007 | Pepin et al. | |
| 2008/0086502 A1 | 4/2008 | Kohlscheen et al. | |
| 2008/0195507 A1 | 8/2008 | Ratnakar | |
| 2009/0150851 A1* | 6/2009 | Boer | G06F 9/44536 717/100 |
| 2009/0300583 A1 | 12/2009 | Cork et al. | |

OTHER PUBLICATIONS

Anonymous, Wikipedia definition of Communication, 2007, https://web.archive.org/web/20070228093637/http://en.wikipedia.org/wiki/Communication.

Anonymous, Wikipedia definition of Hierarchy, 2007, https://web.archive.org/web/20071213143440/http://en.wikipedia.org/wiki/Hierarchy_(object-oriented_programming).

Anonymous, Templates and Templated Classes in C++, 2007, Internet: https://web.archive.org/web/20070609090740/http://www.cprogramming.com/tutorial/templates.html.

* cited by examiner

1000

EXCLUDE/INCLUDE FIELDS

STRUCTURE CONFIGURATION NAME: PO  ~801
STRUCTURE CONFIGURATION DESCRIPTION: PURCHASE ORDER  ~803

OBJECT CLASSES
| PO |
| POLINE |
| POCOST |
| POTERM |
~1010

| FIELD | EXCLUDE |
|---|---|
| AUTHORIZED BY | ☐ |
| SHIPPING TERMS | ☐ |
| DEADLINE | ☐ |
| BILLING METHOD | ☑ ~1015 |

1005 brackets the FIELD column rows.

FIG. 10

SERVICE INTERFACE CREATION AND MODIFICATION FOR OBJECT-ORIENTED SERVICES

BACKGROUND OF THE INVENTION

The present specification relates to the field of exposing object oriented software services to external processes.

Some software applications utilize self-contained software entities known as objects in accomplishing tasks. Software objects can be configured to store data and executable code related to defined processes that can be invoked to manipulate the stored data. Typically, objects are individual instances of one or more object classes (i.e. templates) that define the types of data and processes stored by each object of that class.

One of the perceived advantages of object-oriented software is the versatility with which objects may be defined for a particular application. In some situations, software operations can be streamlined by manipulating custom objects that are defined according to the particular processing needs and end goals of the software, thereby increasing overall operating efficiency.

Often, it can be desirable to allow external systems and/or processes access to services provided by object-oriented software. With the advent of computer networking, object oriented software run by corporations or other larger-scale entities has increasingly been used to expose services to external processes on networked devices. For example, an object-oriented application running on a first system can receive data and/or other parameters provided by external processes over the internet and use the received data to manipulate stored objects according to a service requested by the external process.

BRIEF SUMMARY OF THE INVENTION

A method includes establishing a hierarchy of related software object classes according to a service, receiving data from an external process to invoke the service, and organizing the data received from the external process according to the hierarchy.

A system includes a graphical user interface on a computing device configured to allow a user to organize a plurality of related software object classes into a hierarchy according to a service, and a service interface on a computing device configured to organize data received from an external service according to the hierarchy to allow the external process to invoke the service.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 10 is a diagram of an illustrative screen in a graphical user interface for allowing a user to create an object structure configuration, according to one exemplary embodiment of principles described herein.

Throughout the drawings, identical reference numbers designate similar, but not necessarily identical, elements.

DETAILED DESCRIPTION OF THE INVENTION

Figure 1:
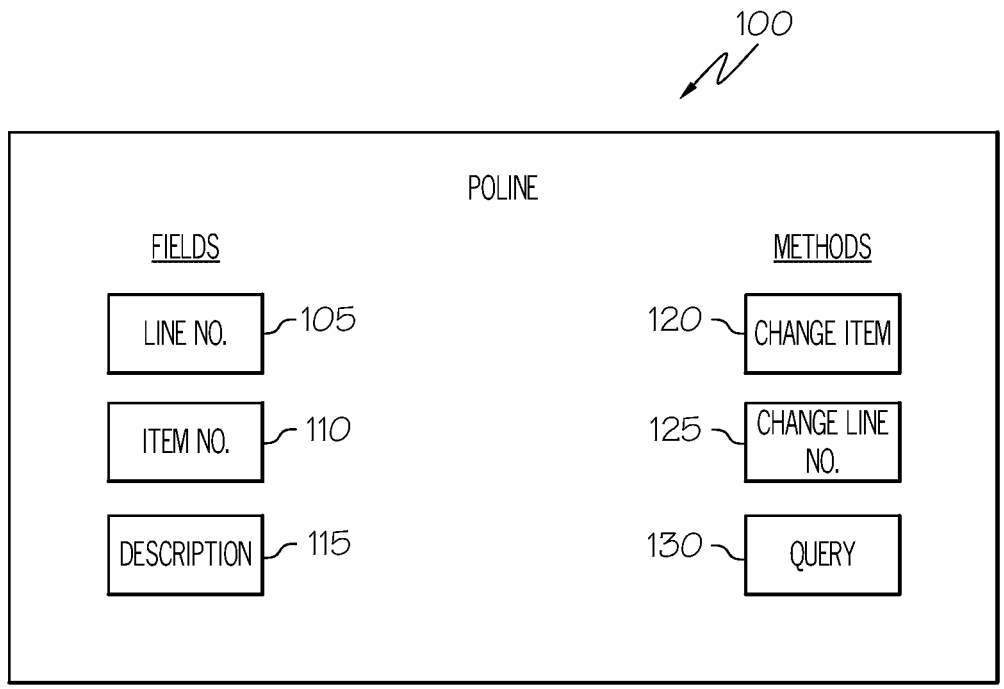
FIG. 1 is a block diagram of an illustrative software object class, according to one exemplary embodiment of principles described herein.

As discussed above, it is often desirable to allow external processes access to services provided by object-oriented software. These services can be provided over a computer network by a first computing device running an object-oriented software application to a second computing device executing the external process that is requesting the service. However, in some cases the external processes requesting services from the object-oriented software are not necessarily configured to directly use or manipulate the custom software objects that form the basis of operations performed by the object-oriented software. Consequentially, some kind of service interface is typically needed to unmarshall data passed between the object-oriented software and the external processes.

Generally individuals with specialized technical knowledge are needed to properly define, code and maintain these service interfaces. Further complicating matters, though, is the fact that often the individuals who are most qualified to determine newly needed services and necessary modifications to existing services do not necessarily possess the specialized technical knowledge required to create the computer code for new service interfaces or modifications to existing service interfaces.

It may be desirable, therefore, to provide a simpler, more user-friendly way to create and modify service interfaces for object-oriented services. To accomplish these and other goals, the present specification discloses methods and systems in which a user can organize a plurality of related software object classes into a hierarchy according to a desired service, without necessarily requiring the user to possess specialized technical knowledge. The user-organized hierarchy can then be used to create a service interface between an external process and object-oriented software such that the external process can invoke the desired service from the object-oriented software. In some embodiments, the principles described herein can be carried out from a graphical user interface without requiring the user to write any computer code.

As used in the present specification and in the appended claims, the terms "software object" and "object" refer to a self-contained software entity that includes both data and logical operations.

As used in the present specification and in the appended claims, the term "hierarchical object structure" or simply "object structure" refers to a set of related software objects which can be grouped together to represent an entity or accomplish a task.

As used in the present specification and in the appended claims, the term "hierarchical object structure template" or simply "object structure template" refers to a template from which external data can be organized to create or identify a hierarchical object structure.

As used in the present specification and in the appended claims, the term "service" refers to any action performed by a first entity at the request of a second entity. The action may be performed by hardware, software, or a combination of hardware and software. A service performed by the first entity may include, but does not necessarily require a response to the second entity.

As used in the present specification and in the appended claims, the term "external process" refers to any entity, algorithm, or action outside the normal operating scope of a given article of software or device configured to execute the given article of software. An external process may be implemented as hardware, software, or a combination of hardware and software.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of tyke present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, an illustrative software object class (100) is shown. The illustrative software object class (100) may be used as a type of template to create software objects. As is widely the case in object-oriented software, each software object used in conjunction with the principles of the present specification may store both data fields and methods related to the manipulation of the data. An object class (100) may define the types of data fields that individual objects of that class are to store and the methods that are included with each individual object of that class for the manipulation of the data stored in the data fields.

By way of example and not limitation, the illustrative software object class (100) shown in FIG. 1 is named POLINE. The POLINE software object class (100) specifies the attributes that each software object implementing the POLINE class must possess. Each software object that implements the POLINE class is said to be an instance of the POLINE class, and may store unique data related to attributes of a line item on a purchase order. For example, according to the illustrative software object class (100) in FIG. 1, an object of the POLINE class may be required to include a line number data field (105), an item number data field (110), and a description data field (115).

The software object class (100) may also specify which type of data is to be stored in each of the data fields (105, 110, 115). For example, the line number data field (105) may be specified to store an integer relating to a relative position of a purchase order line on a purchase order, the item number data field (110) may be specified to store integer data corresponding to a particular item being ordered on the purchase order line, and the description data field (115) may store string data (e.g. characters) related to a description of the item being ordered on the purchase order line.

A software object class (100) may also define methods (120, 125, 130) that may be required in each software object implementing that particular software object class (100). In some embodiments, certain methods (120, 125, 130) may be invoked to manipulate the data stored in the data fields (105, 110, 115). For example, the POLINE software object class (100) illustrated in FIG. 1 may define a change item method (120) that changes the values in the item number and description data fields (110, 115), a change line method (125) that changes the value of the data stored in the line number data field (105), and a query method (130) that returns current data from specified data fields (105, 110, 115).

Figure 2:
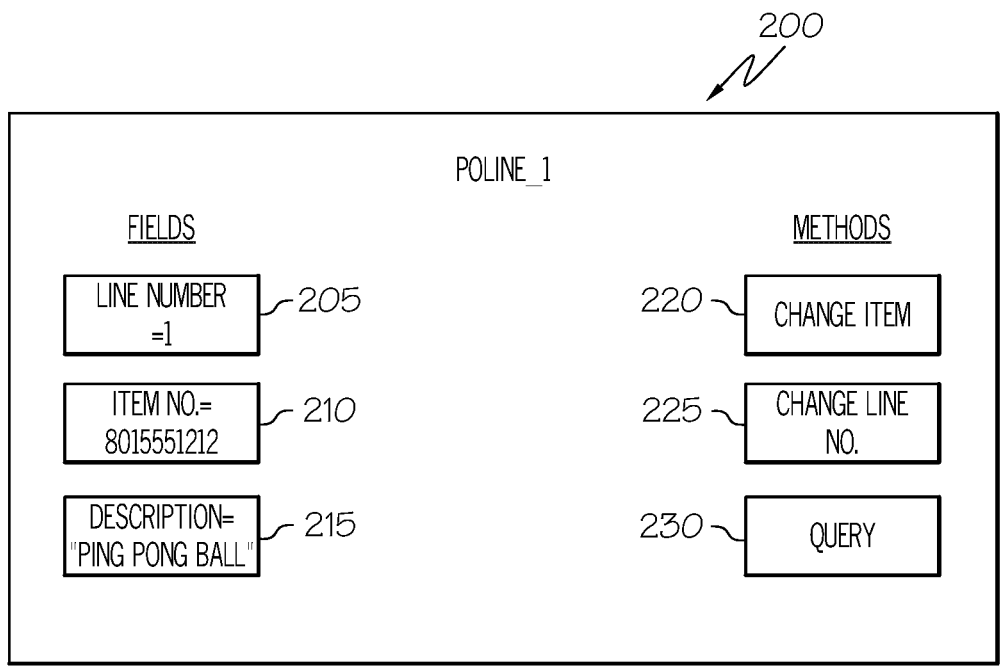
FIG. 2 is a block diagram of an illustrative software object that implements the object class of FIG. 1, according to one exemplary embodiment of principles described herein.

With reference now to FIG. 2, an illustrative software object (200) is shown that implements the illustrative POLINE software object class (100, FIG. 1) described in relation to FIG. 1. The illustrative software object (200) is named POLINE_1 and includes a line number data field (205), an item number data field (210), and a description data field (215) as defined by the POLINE software object class (100, FIG. 1). The data stored in each data field (205, 210, 215) may be unique to this particular software object (200) and representative of an actual line of a received purchase order. The illustrative software object (200) also includes a change item method (220), a change line number method (225), and a query method (230) as defined by the POLINE software object class (100, FIG. 1). By invoking one or more of these methods (220, 225, 230), the data stored in the data fields (205, 210, 215) may be manipulated according to the needs of a particular application.

Figure 3:
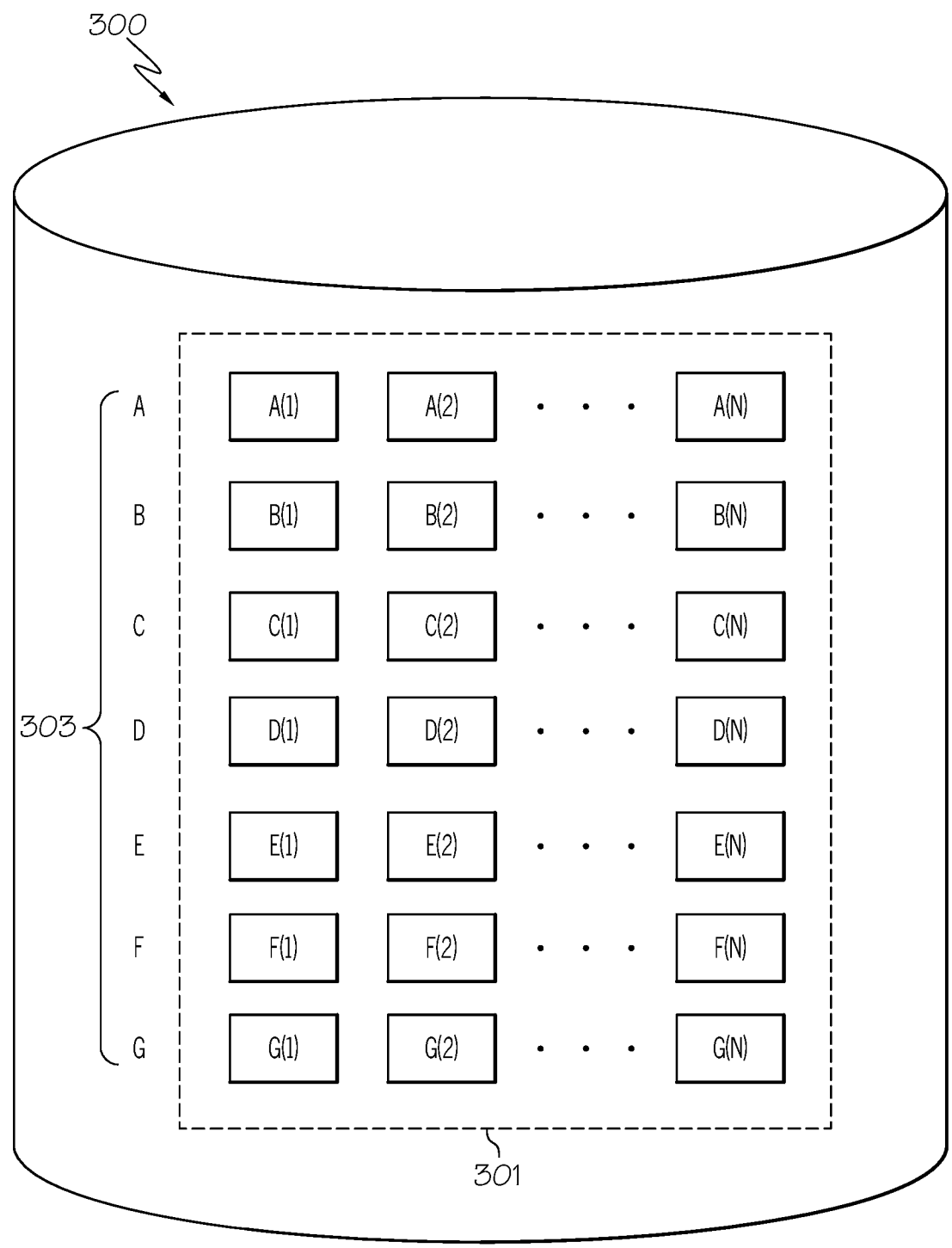
FIG. 3 is a block diagram of an illustrative software object database, according to one exemplary embodiment of principles described herein.

With reference now to FIG. 3, an illustrative database (300) configured to store a plurality of software objects (301) is shown. The database (300) may include physical media configured to physically store a number of software objects (301) and database software configured to organize and access the software objects as a database (300). The database (300) may be configured to store the software objects (301) in an organized manner. By way of example and not limitation, the database (300) of the present example is configured to organize the software objects (301) according to the software object classes (303) implemented by the software objects (301). In other embodiments, databases (300) of software objects may be organized and stored according to any suitable methodology and on any physical media as may suit a particular application of the principles described herein. It will be readily apparent that many such organization schemes, operating software, and physical media are available in the art.

Figure 4A:
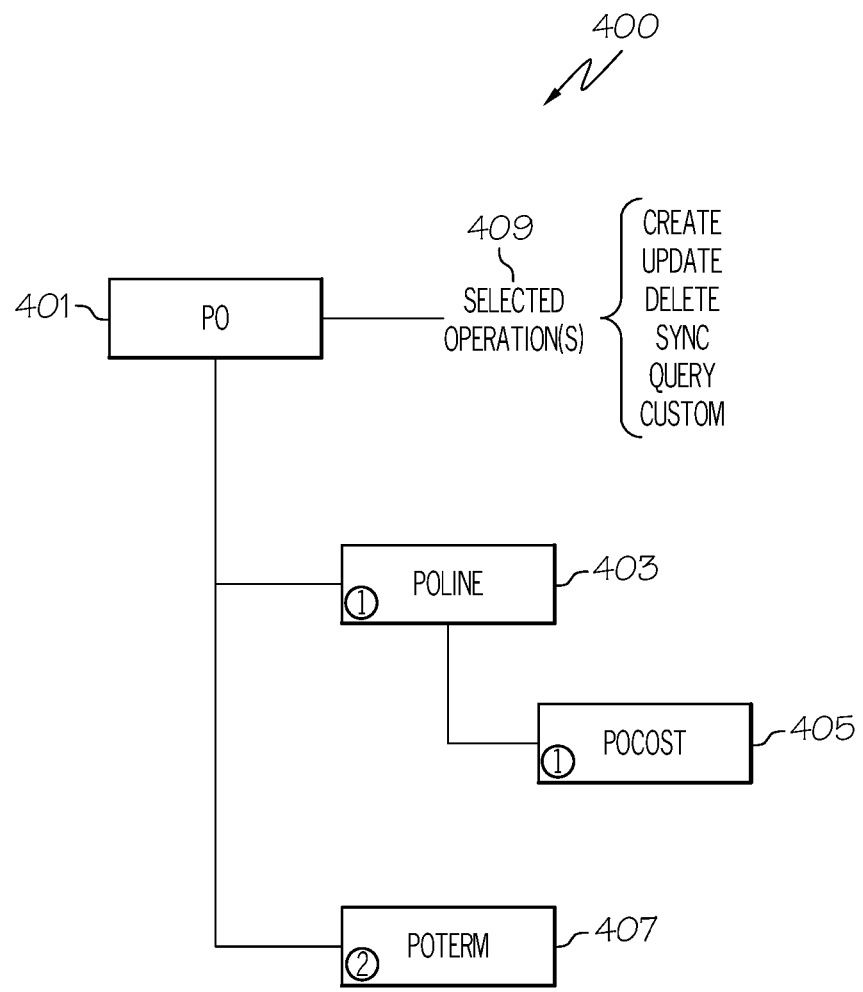
FIG. 4A is a block diagram of an illustrative hierarchical object structure configuration, according to one exemplary embodiment of principles described herein.

Referring now to FIG. 4A, an illustrative object structure configuration (400) is shown. The object structure configuration (400) may include a hierarchical organization of software object classes (401, 403, 405, 407) that are defined by a root software class (401). Object structures may be formed by creating software object implementing the classes (401, 403, 405, 407) defined by the object structure configuration (400) and organizing the instantiated software objects according to the hierarchical relationship defined by the object structure configuration (400). By way of example and not limitation, the present object structure configuration (400) may be used to define a purchase order class that organizes purchase order-related software object classes (401, 403, 405, 407) to represent the organization of data in a purchase order. A root PO object class (401) is a parent to the POLINE object class (403) and a POTERM object class (407). A POCOST object class (405) is a child of the POLINE object class (403). Parent-child relationships in the object structure configuration (400) may define data-dependent relationships among the data stored by software objects implementing the object classes (401, 403, 405, 407) defined by the object structure configuration (400).

The object structure configuration (400) may be used in a service interface to organize data received from an external process according to data stored by each object class (401, 403, 405, 407) in the object structure configuration (400) and define how to use the organized data in conjunction with an object-oriented software application to create new software objects in storage, modify or delete existing software objects, query existing software objects, and/or perform custom software object operations on the data. By using the object structure configuration (400) to create new software objects and/or modifying existing software objects according to the external data, the external data received from the external process may then be accessible to internal processes of the object-oriented application.

The data received from the external process may be organized and mapped to corresponding software object classes (401, 403, 405, 407) defined by the hierarchical structure (400) according to the types of data each object class (401, 403, 405, 407) is configured to store. The software object classes may be recognized by the object-oriented application and used for the storage and manipulation of data within the application. Together, the object structure configuration (400) and the external data mapped to the object classes (401, 403, 405, 407) may provide all of the information needed for the object-oriented application to incorporate the organized data into actual software objects stored by the application. The object structure configuration (400) may include a root object class (401) from which all other software object classes (403, 405, 407) in the object structure configuration (400) depend.

One or more operations (409) may be defined in conjunction with the object structure configuration (400) to specify how external data mapped to specific object classes (401, 403, 405, 407) in the object structure configuration (400) are to be treated when received by the object-oriented application. By way of example and not limitation, the present object structure configuration (400) may be configured to define operation instructions with regard to one or more of the object classes (401, 403, 405, 407) in the object structure configuration (400). This operation instructions may include, for example, create, update, delete, sync, query, and/or custom, as shown in FIG. 4A. It will be understood that other embodiments of the principles described herein may include additional or alternate operations as may suit particular development circumstances.

The create operation may be used to instruct the object-oriented application to create and store one or more new software objects according to the external data being mapped to the software object classes (401, 403, 405, 407) of the object structure configuration (400). When this operation is invoked, data from the external process that has been mapped to selected software object classes (401, 403, 405, 407) in the object structure configuration (400) will be newly instantiated in the object-oriented application storage as true software objects implementing their corresponding software object classes (401, 403, 405, 407).

The update operation may be used to instruct the object-oriented application to look up an existing software object according to an object structure definition stored by the object-oriented application that includes a root software object identifiable by external data currently mapped to the root software object class (401) in the object structure configuration (400). The existing software objects in the identified object structure may then be modified or deleted and/or new software objects instantiated in the storage of the object-oriented application according to differences between the external data mapped to the object structure configuration (400) and the data stored by the software objects in the identified existing object structure.

The delete operation may also be used to instruct the object-oriented application to look up an existing software object stored by the object-oriented application that includes a root software object identifiable by external data currently mapped to the root software object class (401) in the object structure configuration (400) and delete existing software objects according to external data currently mapped to corresponding object classes (401, 403, 405, 407) in the object structure configuration (400).

The sync operation may also be used to instruct the object-oriented application to check for the existence of a software object stored by the object-oriented application that includes a root software object identified by external data currently mapped to the root software object class (401) in the object structure configuration (400). If such an object structure already exists in storage of the object-oriented application, the object-oriented application is instructed to update the objects therein according to the external data mapped to the current object structure configuration (400). If the identified object structure does not exist, the object-oriented application is instructed to create a new object structure having newly instantiated software objects corresponding to the object classes (401, 403, 405, 407) of the object structure configuration (400) that store the external data currently mapped to the associated classes in the object structure configuration (400).

The query operation may be used to instruct the object-oriented application to check for the existence of a software object stored by the object-oriented application that includes a root software object identified by external data currently mapped to the root software object class (401) in the object structure configuration (400) and return specified response data from the identified software objects to the interface service, which may then forward the response data to the external process.

In embodiments where custom operations are defined with regard to art object structure configuration (400) and/or at least one object class (401, 403, 405, 407), these custom operations may also be defined in conjunction with the object structure configuration (400) such that the object-oriented application may be instructed to execute one or more custom operations in conjunction with the external data mapped to the object structure configuration (400). For example, custom operations defined in the software object class (100, FIG. 1) of FIG. 1 include a Change Item method (120, FIG. 1) and a Change Line No. method (125, FIG. 1). Therefore, in certain exemplary embodiments utilizing this software object class (100, FIG. 1) in the object structure configuration (400), at least one of these methods (120, 125, FIG. 1) may be invoked on one or more software objects (200, FIG. 2) implementing the software object class (100, FIG. 1) as defined by the object structure configuration (400).

In certain applications, the order in which external data mapped to the object structure configuration (400) are processed by the object-oriented application may be significant. Therefore, the object structure configuration (400) may also be configured to specify a processing order for sibling software object classes (403, 407). In the present example, software object class POLINE (403) has a defined processing order of "1" and software object class POTERM (407) has a defined processing order of "2." Thus, external data mapped to software object class POLINE (403) in the object structure configuration (400) may be presented to the object-oriented application prior to external data mapped to software object class POTERM (407). As software object class POCOST (405) is a child of software object class POLINE (403) in the object structure configuration (400), external data mapped to software object class POCOST (405) may inherit the processing order from parent POLINE and thus be processed prior to external data mapped to software object class POTERM (407).

Figure 4B:
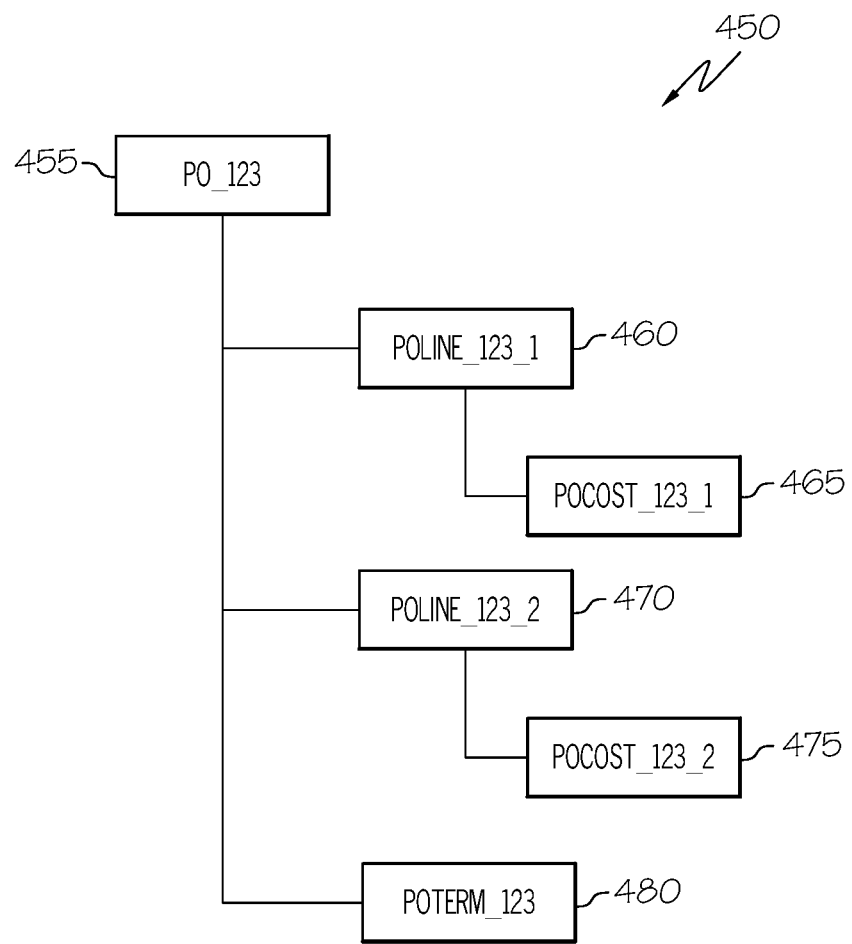
FIG. 4B is a block diagram of an illustrative hierarchical object structure that implements the configuration of FIG. 4A, according to one exemplary embodiment of principles described herein.

Referring now to FIG. 4B, an illustrative software object structure (450) implementing the illustrative object structure configuration (400) is created by mapping external data to the object structure configuration (400). The illustrative object structure (450) may include a hierarchically organized group of software objects (455, 460, 465, 470, 475, 480) according to the object classes (401, 403, 405, 407) and hierarchy defined by the object structure configuration (400) of FIG. 4A. Whereas the illustrative software object structure configuration (400) functions to provide the organization for the object structure (450), the object structure (450) may store data in data fields of unique software objects (455, 460, 465, 470, 475, 480) that correspond to purchase order data received from an external process.

The illustrative software object structure (450) includes a unique root object PO_123 (455) of class PO that stores general data from the purchase order and pointers to the other software objects (460, 465, 470, 475, 480) in the object structure (450). A unique software object POLINE_123_1 (460) implements class POLINE and stores data relating to a first line of the purchase order. A unique software object POCOST_123_1 (465) implements class POCOST and depends from purchase order line data in POLINE_123_1 (460) to store data related to the cost of items specified in POLINE_123_1 (460). Another unique software object POLINE_123_2 (470) also implements class POLINE and stores data relating to a second line of the purchase order. A unique software object POCOST_123_2 (475) implements class POCOST and depends from purchase order line data in POLINE_123_2 (470) to store data related to the cost of items specified in POLINE_123_2 (470). Finally, a unique software object POTERM_123 (480) implements class POTERM and stores data relating to the terms of the purchase order.

The illustrative software object structure (450) may be stored by an object-oriented application configured to process purchase orders, with each of the software objects (455, 460, 465, 470, 475, 480) being stored in a database (300, FIG. 3) for future retrieval. It should be noted that the quantity of software objects (455, 460, 465, 470, 475, 480) in the object structure (450) need not necessarily be specified or limited by the object structure configuration (400) used to build the object structure (450) from the external data. For example, two lines were specified in the purchase order from the external process, so two instances of POLINE objects were created in the object structure (450) in conformance with the hierarchical structural limitations imposed by the object structure configuration (400).

Figure 5:
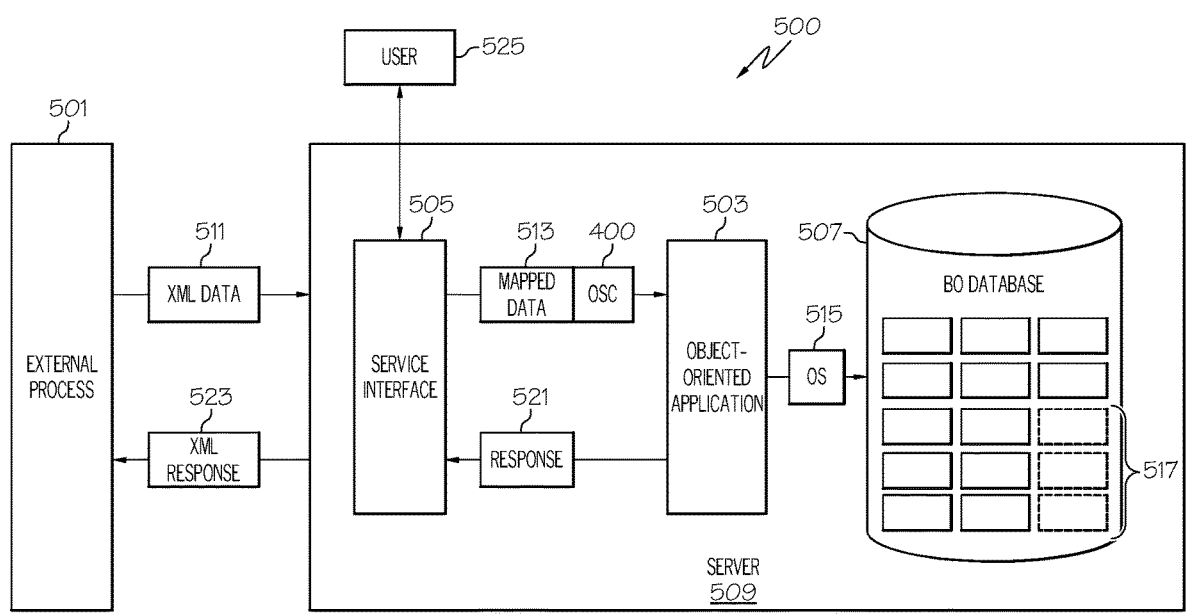
FIG. 5 is a block diagram of an illustrative system for providing an object-oriented service to an external process, according to one exemplary embodiment of principles described herein.

Referring now to FIG. 5, a block diagram is shown of an illustrative system (500) in which an external process (501) interacts with an object-oriented software application (503) via a service interface (505). A software object database (507) is configured to store a plurality of software objects used by the object-oriented application (503). In the present example, the object-oriented application (503), the service interface (505), and the software object database (507) are stored and implemented by a server (509), with the service interface (505) being any XML based service available to the external process (501) via a computer network such as the Internet. However, it will be understood that any one or more computing devices that may suit a particular application may be used to store, operate, or implement the external process (501), the object-oriented application (503), the service interface (505), and/or the software object database (507), as may suit a particular application of the principles described herein. Moreover, any communication hardware, software, and/or protocol may be used to facilitate communication between any of the modules of the present system (500) as may suit a particular application of the principles described herein.

In certain embodiments, the external process (501) of the present system (500) may include a software application running on a computing device separate from the server (509). Alternatively, the external process (501) may be a separate software application running on at least one computing device also configured to run at least a portion of the service interface (505), the software object database (507), and/or the object-oriented application (503). The external process (501) may provide external data (511) to the service interface (505) in an eXtensible Markup Language (XML) format according to conventions. The service interface (505) may then receive the external data (511) and map portions of the external data (511) to specific classes of an object structure configuration (400) as described above.

It will be understood that the mapping of the external data (511) to the object classes (401, 403, 405, 407, FIG. 4) of the object structure configuration (400) may occur before or after the external data (511) is received by the service interface (505). In certain embodiments, the external process (501) may be configured to provide the external data (511) to the service interface (505) in such a way that it is inherent from the XML coding in the external data (511) which portions of the data (511) correspond to which object classes (401, 403, 405, 407, FIG. 4) in the object structure configuration (400). Alternatively, the external data (511) may be translated by the service interface (505) prior to mapping portions of the external data (511) to corresponding object classes (401, 403, 405, 407, FIG. 4) in the object structure configuration (400, FIG. 4).

The mapped data (513) and object structure configuration (400) are then sent to the object-oriented application (503), which, in turn, manipulates the software object database (507) using the information in the hierarchically structured data (513) to create a new software object (515), modify an existing software object (517), delete an existing software object, query an existing software object (517), and/or perform a custom operation on an existing software object (517) specified in the object structure configuration (400). One or more responses (521) from the object-oriented application (503) may be communicated to the service interface (505) according to the operation(s) performed on the database (507). The service interface (505) may, in turn, forward XML responses (523) to the external process (501).

As with many such systems, the services required by the external process (501) and/or provided by the object oriented application (503) may be subject to periodic change. When such change occurs, a change in the operation of the service interface (505) may also be necessary. For example, if a change is experienced in the way the external data (511) is provided to the service interface (505), a change in the object structure configuration (400) and/or the mapping of the external data to the object structure configuration (400) may be necessary. Moreover, if different functionality is required from the object-oriented application (503), the operations requested by the service interface (505) as part of the object structure configuration (400) may also require a change.

As such, the present system (500) allows for a user (525) to create and/or update the service interface (505) as needed without an in-depth knowledge of computer coding. The service interface (505) may be configured to allow changes to be made to the object structure configuration (400, FIG. 4) of the mapping of data (511) without requiring an overhaul of the coding in the system (500) or even a restart of the server (509). With a rudimentary understanding of the interface service and the concepts of software object classes, software object structure configurations (400), and software object structures (450), the user (525) may be able to reconfigure the service interface (505) using a Graphical User Interface (GUI) installed on the server (509) that allows the user to quickly and efficiently reconfigure an object structure configuration (400), a mapping algorithm, and/or the services requested of the object-oriented application (503).

Figure 6:
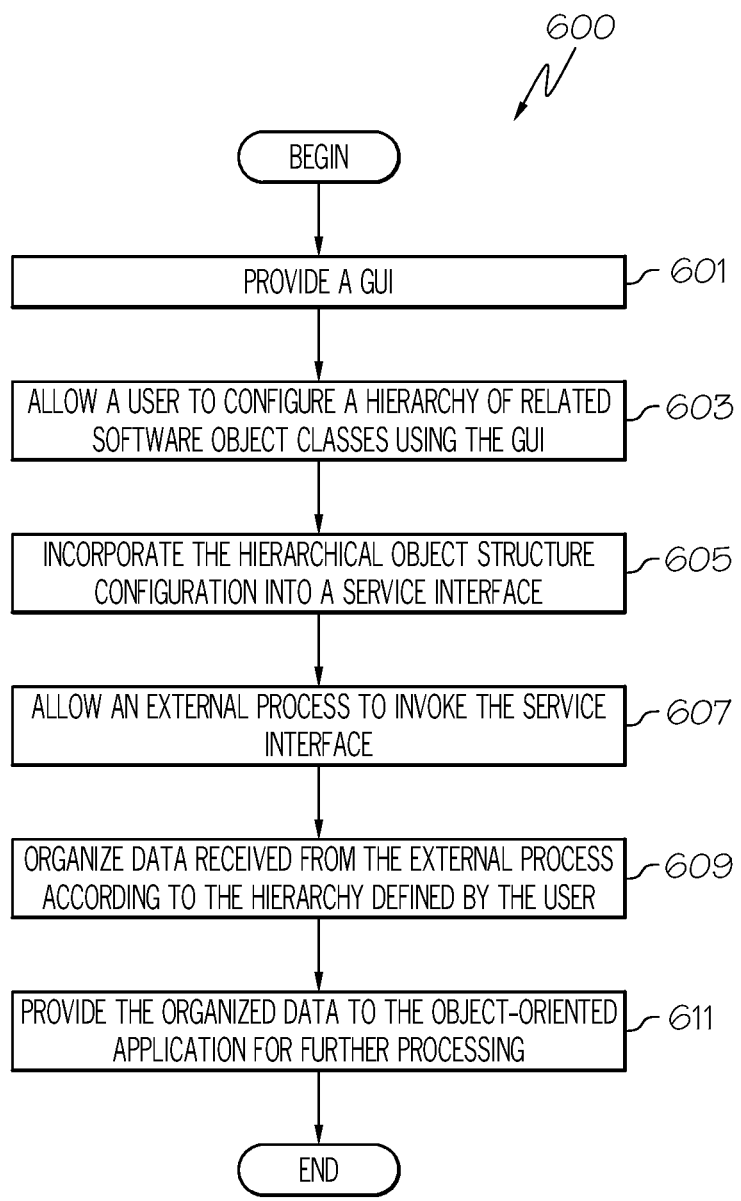
FIG. 6 is a flowchart illustration of an illustrative method for providing an interface service between an object-oriented application and an external process, according to one exemplary embodiment of principles described herein.

Referring now to FIG. 6, a flowchart is shown of an illustrative method (600) for providing an interface service between an object-oriented application and an external process. As discussed previously, it may be desirable to provide an intuitive way for a user to dynamically configure the service interface according to changing needs of the service without requiring an extensive (or any) knowledge of computer coding. The present method (600) allows a user to create and/or modify an object structure configuration for use in the service interface. In certain embodiments, the user may be able to do so without having to write a single line of formal computer code.

The method (600) includes providing (step 601) a Graphical User Interface (GUI) (not to be confused with the service interface that is being configured for use between the object-oriented application and the external process). The GUI allows (step 603) the user to configure a hierarchy of related software object classes (i.e. an object structure configuration (400, FIG. 4) according to the principles described previously). The hierarchy of related software object classes may be incorporated (step 605) into the service interface, and the external process allowed (step 607) to invoke the service interface by providing XML data to the service interface. The XML data may then be organized (step 609) by the service interface and mapped to specific software object classes in the hierarchy created by the user. The organized data may then be provided (step 611) to the object-oriented application to complete an operation requested by the external operation.

Figure 7:
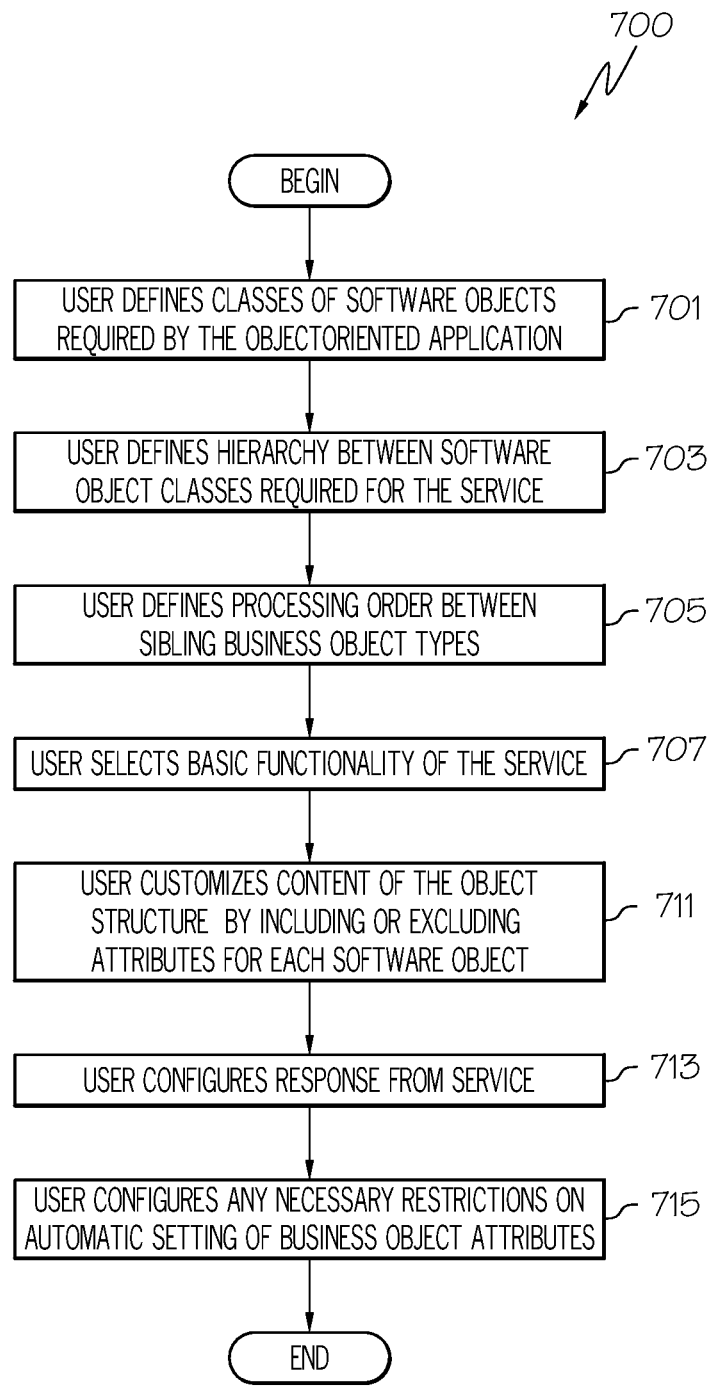
FIG. 7 is a flowchart illustration of an illustrative method for creating an object structure configuration, according to one exemplary embodiment of principles described herein.

Referring now to FIG. 7, a flowchart is shown of a method (700) of configuring a hierarchical structure for a service interface. The steps represented by the present method (700) are a more detailed representation of the previously recited single step of allowing (step 603, FIG. 6) a user to configure a hierarchy of related software object classes using the GUI.

In the method (700), the user defines (step 701) software object classes required by the object-oriented application to perform operations requested by the external process through the service interface. This may entail selecting from a plurality of software object classes compatible with the object-oriented application the software object classes that can best store and manipulate the type of data being received from the external process. The user then defines (step 703) the hierarchical relationships between software object classes required for the service and defines (step 705) a processing order between sibling software object classes in the hierarchy. The user may then select (step 707) the basic functionality of the service interface in accordance with the principles described in relation to FIG. 4 (i.e. create, update, delete, sync, query, custom operations, etc.) and customize (step 711) the content of the hierarchical structure accordingly by including or excluding attributes for each software object. The user may then configure (step 713) a response to the external process from the service interface. This response may be related to an expected response from the object-oriented application to the service interface. The user may also configure (step 715) any necessary restrictions on the automatic setting of software object attributes which may occur when new software objects are instantiated from the external data to create a new object structure or when existing software objects stored by the object-oriented application are modified using the external data.

Figure 8:
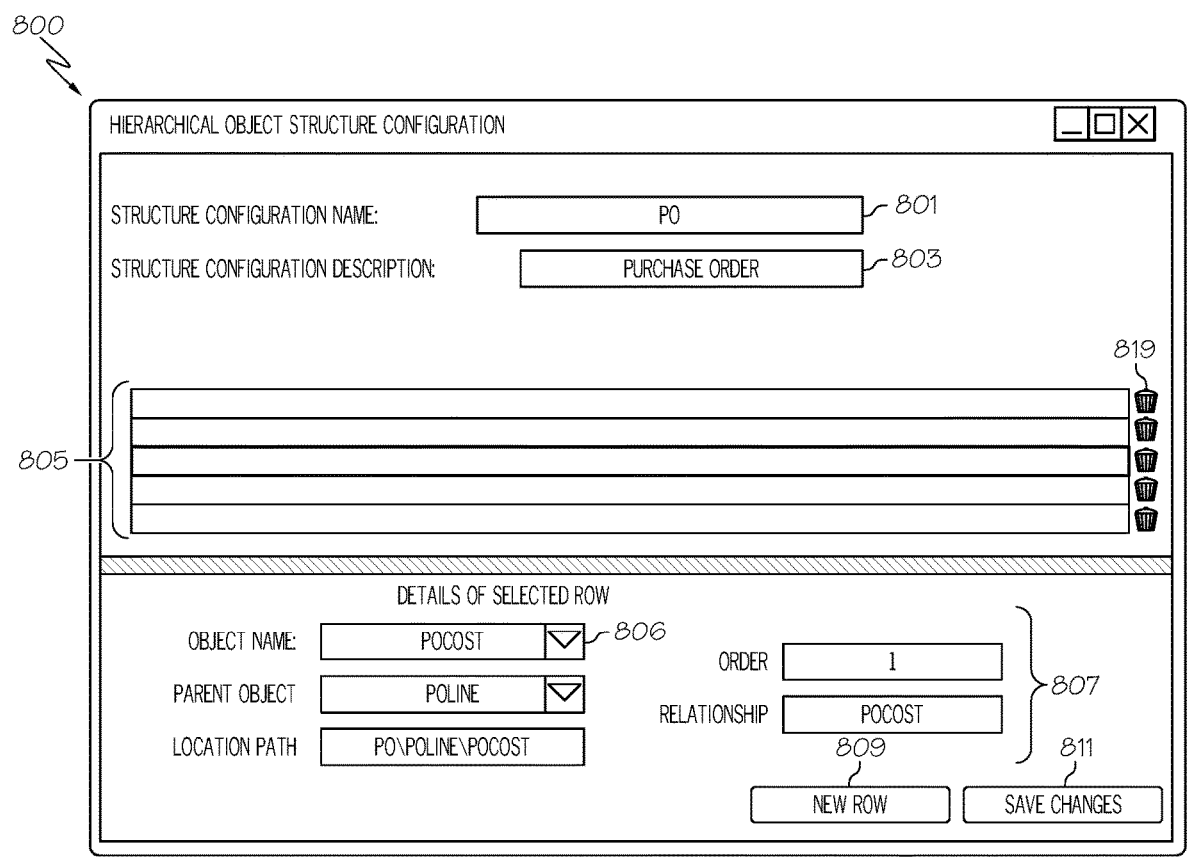
FIG. 8 is a diagram of an illustrative screen in a graphical user interface for allowing a user to create an object structure configuration, according to one exemplary embodiment of principles described herein.
Figure 9:
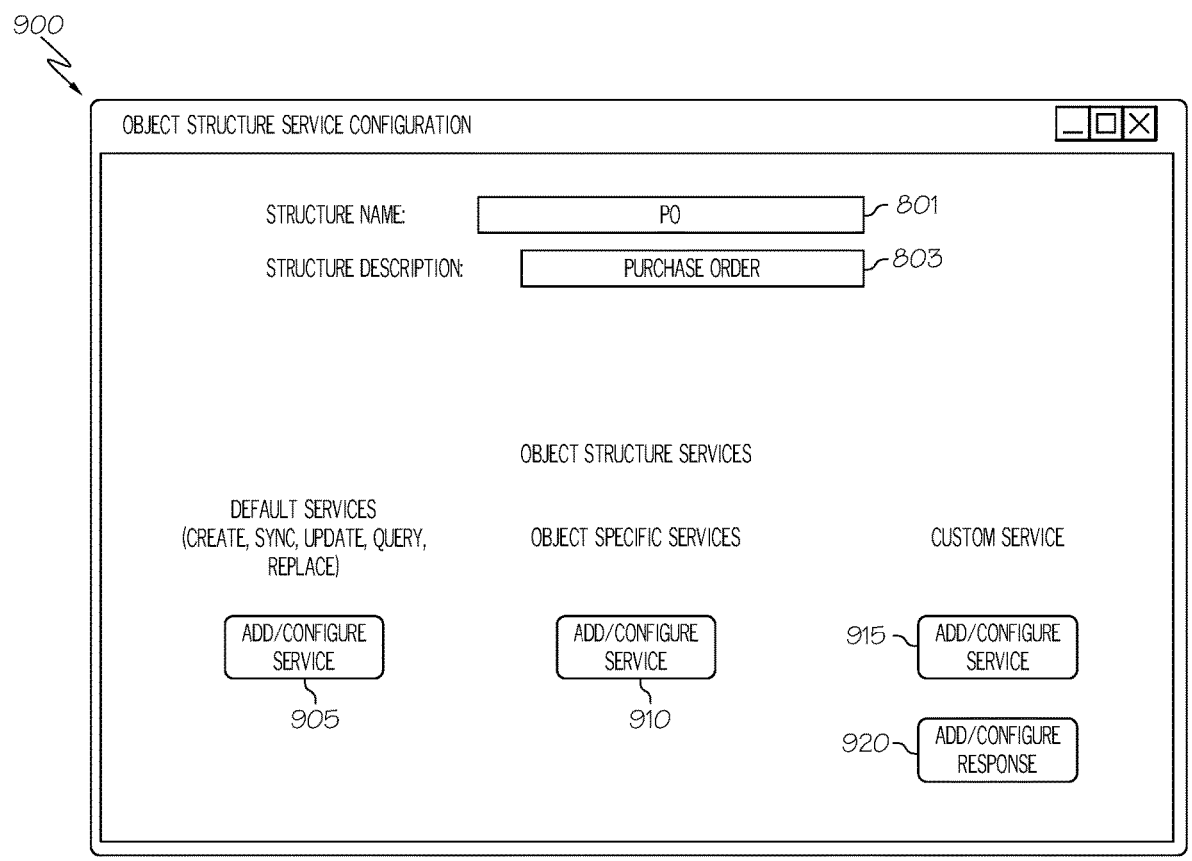
FIG. 9 is a diagram of an illustrative screen in a graphical user interface for allowing a user to create an object structure configuration, according to one exemplary embodiment of principles described herein.

Referring now to FIGS. 8-10, the functionality of an illustrative GUI adapted to allow a user to configure a service interface is shown. It will be understood that the functionality of the GUI may be accomplished in any of a variety of possible ways. The present figures are merely indicative of one illustrative embodiment and are not intended to represent the scope of possible user interfaces that may be provided to a user to allow the user to configure a service interface. Moreover, for illustrative purposes only, the operation of the illustrative GUI of the FIGS. 8-10 is described in connection with the creation of an interface service to facilitate the transfer of purchase order data from an external process or system to an object-oriented application. It will be understood, however, that the present methods and systems may be applied to service interfaces and object-oriented applications dealing with any type of data or service as may suit a particular application.

Referring more specifically to FIG. 8, an illustrative screen (800) in a graphical user interface is shown. This particular screen (800) may be used to allow the user to create a new object structure configuration (400, FIG. 4) or modify an existing object structure configuration (400, FIG. 4). The user may select software object classes (401, 403, 405, 407) to include in the object structure configuration (400, FIG. 4) and define hierarchical relationships and processing order between specific software object classes (401, 403, 405, 407). Using the illustrative screen (800), the user can assign a name (801) to a newly created object structure configuration (400, FIG. 4) or view the name (801) of an object structure configuration (400, FIG. 4) being modified. Similarly, a description (803) of the object structure configuration (400, FIG. 4) may be displayed and/or edited.

A table (805) of the selected software object classes (401, 403, 405, 407, FIG. 4) included in the hierarchical object structure configuration (400, FIG. 4) may also be displayed by the present screen (800) of the graphical user interface. Each of the software object classes (401, 403, 405, 407, FIG. 4) in the object structure configuration (400, FIG. 4) may be selected from a list of software object classes supported by the object-oriented application (503, FIG. 5) using, for example, a dropdown menu (806).

By way of example and not limitation, the table (805) may display information about each software object class (401, 403, 405, 407, FIG. 4) in the object structure configuration (400, FIG. 4), such as the name of the software object class (401, 403, 405, 407, FIG. 4), the name of any parent object class (401, 403, FIG. 4), the hierarchical location of the software object class (401, 403, 405, 407, FIG. 4) with respect to the root software object class (401, FIG. 4), a "relationship" designator, and a defined processing order. In the present example, the user has defined POLINE and POTERM as sibling children of PO, and POCOST as a child of POLINE due to the data association between a POCOST object and a POLINE object, consistent with the object structure configuration (400, FIG. 4) shown in FIG. 4.

In the present example, a user may be able to edit the details (807) of a specific row by selecting the row in the table (805) with a cursor. By selectively editing these details (807), hierarchical relationships among the software object classes (401, 403, 405, 407, FIG. 4) in the object structure configuration (400, FIG. 4) may be created or modified by the user according to the specifications of the web-based interface service being configured. One or more additional software object classes (401, 403, 405, 407, FIG. 4) may be added to the object structure configuration (400, FIG. 4) by clicking on a "new row" button (809) and editing the details of the new software object classes (401, 403, 405, 407, FIG. 4). Software object classes (401, 403, 405, 407, FIG. 4) may also be deleted from the object structure configuration (400, FIG. 4) by rows in the table (805), for example with icons (819), that correspond to the specific software object classes (401, 403, 405, 407, FIG. 4) to be removed from the object structure configuration (400, FIG. 4). In the present example, changes may be saved to the object structure configuration (400, FIG. 4) by clicking on a "save changes" button (811) in the screen (800).

Referring now to FIG. 9, another illustrative screen (900) in the graphical user interface is shown. In this screen (900), the user may be allowed to specify one or more requested operations to be transmitted by the service interface (505) to the object-oriented application (503, FIG. 5) in conjunction with the mapped data (513) and the object structure configuration (400, FIG. 4) such that the object-oriented application (503, FIG. 5) performs the specified operations. By configuring these operations, the user can define the type of service to be performed by the object-oriented application (503, FIG. 5) when external data (511, FIG. 5) is received by the service interface (505, FIG. 5) from the external process (501, FIG. 5).

By way of example and not limitation, user-selectable buttons (905, 910, 915) may be provided in the GUI such that the user can select from and configure default operations (create, sync, update, query, replace) that can be performed on external data mapped to any type of software object class (403, 405, 407, FIG. 4) in the object structure configuration (400), operations that can be performed only on external data mapped to a certain type of software object class (403, 405, 407, FIG. 4) in object structure configuration (400), and custom operations defined by the user. Additionally, the GUI may allow the user to add or configure a desired response (521, FIG. 5) from the object-oriented application (503, FIG. 5) with another user-selectable button (920).

Referring now to FIG. 10, another illustrative screen (1000) in the graphical user interface is shown. By way of example and not limitation, this screen (1000) may allow a user to view a list (1005) of data fields (205, 210, 215, FIG. 2) associated with each software object class (401, 403, 405, 407, FIG. 4) included in the object structure configuration (400, FIG. 4). For example, the software object class POTERM is selected in the present screen (1000), and the list (1005) of fields includes data fields associated with the software object class POTERM (407, FIG. 4) that may be selectively excluded from use in the present object structure configuration (400, FIG. 4). For example, if the POTERM object class (407, FIG. 4) includes a "Billing Method" field and the user knows that purchase order data provided by an external process (501, FIG. 5) would not include a billing method identifier, the user may choose to exclude that data field from the object structure configuration (400, FIG. 4) as shown. Under these circumstances, external purchase order data received from the external process (501, FIG. 5) would not be mapped to the "Billing Method" data field in the POTERM class (407, FIG. 4), and individual instances of POTERM created from the external data in object structures (450, FIG. 4) that implement the object structure configuration (400, FIG. 4) may be configured to not store data in a "Billing Method" field.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of implementing a service interface for an object-oriented application providing a service on a network using a server computer, the method comprising:
   with a graphical user interface, receiving user input specifying an object structure configuration for the service interface, the user input comprising selection of software object classes included in the object structure configuration for the service and establishing a specified hierarchy and processing order between the included software object classes, wherein the graphical user interface provides a listing of defined software object classes which can be selected and included in the object structure configuration and controls for specifying the processing order among the software object classes in the specified hierarchy;
   with the graphical user interface, receiving further user input specifying at least one requested operation to be transmitted by the service interface to the object-oriented application in conjunction with the object structure configuration; and
   implementing the service interface for the object-oriented application based on the object structure configuration, wherein the object structure configuration comprises the selected software object classes and the specified processing order among the software object classes in the specified hierarchy.

2. The method of claim 1, wherein the hierarchy comprises at least one of: a new hierarchy created by a user with the graphical user interface, and an existing hierarchy modified by the user with the graphical user interface.

3. The method of claim 1, wherein establishing the hierarchy further comprises adding at least one software object class to the hierarchy from a plurality of defined software object classes.

4. The method of claim 1, wherein establishing the hierarchy further comprises deleting at least one software object class from the hierarchy.

5. The method of claim 1, wherein establishing the hierarchy further comprises defining dependency relationships between the related software object classes in the hierarchy.

6. The method of claim 1, further comprising performing the service using the data received from an external process via the service interface.

7. The method of claim 6, wherein the service comprises at least one of: creating at least one new software object structure component according to the hierarchy, updating at least one existing software object structure according to the hierarchy, deleting at least one existing software object structure according to the hierarchy, at least one operation specific to a certain type of software object, and at least one custom operation defined by the user.

8. The method of claim 6, further comprising communicating a response to the external process from the service via the service interface.

9. The method of claim 1, further comprising, with the service interface, organizing data received from an external process according to the hierarchy by mapping portions of the data to specific software object classes in the hierarchy.

10. The method of claim 1, wherein the service interface receives data from an external process in an eXtensible Markup Language (XML) format.

11. The method of claim 1, further comprising reconfiguring the service interface with a change to the hierarchy without restarting the server computer.

12. A system, comprising:
a computing device comprising a processor, display device and user input device, the computing device further comprising a graphical user interface configured to allow a user to organize a plurality of related software object classes into a hierarchy according to a desired service to be provided by object-oriented software that uses the hierarchy of software object classes, the graphical user interface comprising controls for specifying a processing order among software object classes in said hierarchy;
the computing device programmed to perform:
with the graphical user interface, receiving user input specifying an object structure configuration for a service interface, the user input comprising selection of software object classes included in the object structure configuration for the service and establishing a specified hierarchy and processing order between the included software object classes, wherein the graphical user interface provides a listing of defined software object classes which can be selected and included in the object structure configuration and controls for specifying the processing order among the software object classes in the specified hierarchy;
with the graphical user interface, receiving further user input specifying at least one requested operation to be transmitted by the service interface to the object-oriented application in conjunction with the object structure configuration; and
implementing the service interface for the object-oriented software based on the object structure configuration, wherein the object structure configuration comprises the selected software object classes and the specified processing order among the software object classes in the specified hierarchy.

13. The system of claim 12, wherein the hierarchy comprises a new hierarchy created by the user with the graphical user interface.

14. The system of claim 12, wherein the hierarchy comprises an existing hierarchy modified by the user with the graphical user interface.

15. The system of claim 12, wherein said service interface is further configured to provide a response to said an external process upon completion of said service.

16. The system of claim 12, wherein the service comprises creating at least one new software object structure component according to the hierarchy.

17. The system of claim 12, wherein the service comprises updating at least one existing software object structure according to the hierarchy.

18. The system of claim 12, wherein the service comprises deleting at least one existing software object structure according to the hierarchy.

19. The system of claim 12, wherein the service comprises, and at least one custom operation defined by the user.

20. A computer program product comprising a non-transitory, computer-readable storage medium having instructions that, when executed by a server computer, cause the server computer to implement a service interface for an object-oriented application providing a service by performing:
with a graphical user interface, receiving user input specifying an object structure configuration for the service interface, the user input comprising selection of software object classes included in the object structure configuration for the service and establishing a specified hierarchy and processing order between the included software object classes, wherein the graphical user interface provides a listing of defined software object classes which can be selected and included in the object structure configuration and controls for specifying the processing order among the software object classes in the specified hierarchy;
with the graphical user interface, receiving further user input specifying at least one requested operation to be transmitted by the service interface to the object-oriented application in conjunction with the object structure configuration; and
implementing the service interface for the object-oriented application based on the object structure configuration, wherein the object structure configuration comprises the selected software object classes and the specified processing order among the software object classes in the specified hierarchy.

* * * * *